(12) United States Patent
Tucker

(10) Patent No.: US 6,672,029 B2
(45) Date of Patent: Jan. 6, 2004

(54) PIPE SUPPORT APPARATUS

(76) Inventor: Woodrow James Tucker, 6145 Main St., Newport Richey, FL (US) 34653

( * ) Notice: Subject to any disclaimer, the term of this patent is extended or adjusted under 35 U.S.C. 154(b) by 117 days.

(21) Appl. No.: 10/012,550

(22) Filed: Dec. 12, 2001

(65) Prior Publication Data

US 2003/0108130 A1 Jun. 12, 2003

(51) Int. Cl.[7] .............................. E04B 1/00; E04G 21/00
(52) U.S. Cl. ..................... 52/745.21; 52/127.2; 52/714; 52/699; 248/73; 249/91
(58) Field of Search ........................... 52/745.21, 220.8, 52/127.2, 713, 714, 715, 699, 170, 146; 248/62, 72, 73, 27.8; 249/91, 93

(56) References Cited

U.S. PATENT DOCUMENTS

| | | | |
|---|---|---|---|
| 3,150,429 A | 9/1964 | Shaffer | |
| 3,163,909 A | 1/1965 | Williams | |
| 323,837 A | * 9/1966 | Willert | ......................... 211/71 |
| 3,912,218 A | 10/1975 | Lister | |
| 3,960,356 A | 6/1976 | Adams | |
| 4,625,343 A | * 12/1986 | Bumgarner | ................... 249/91 |
| 4,697,770 A | 10/1987 | Kirschner | |
| 4,803,825 A | * 2/1989 | Wheeler | ...................... 249/91 |
| 5,125,619 A | 6/1992 | Collins | |
| 5,146,720 A | 9/1992 | Turner | |
| D330,504 S | 10/1992 | Collins | |
| 5,240,224 A | 8/1993 | Adams | |
| 5,337,534 A | 8/1994 | Nasca | |
| 5,388,804 A | 2/1995 | Cohen et al. | |
| D379,584 S | 6/1997 | Lindquist | |
| 5,688,428 A | 11/1997 | Maguire | |
| 5,813,188 A | 9/1998 | Behlen | |
| 5,836,130 A | 11/1998 | Unruh et al. | |
| 6,047,515 A | 4/2000 | Behlen | |
| 6,065,730 A | 5/2000 | Marks et al. | |

* cited by examiner

Primary Examiner—Jeanette Chapman
Assistant Examiner—Chi Q. Nguyen
(74) Attorney, Agent, or Firm—Hall, Priddy, Myers & Vande Sande

(57) ABSTRACT

Apparatus for supporting the pipes of a plumbing system during the construction of a cement building structure. More specifically, apparatus which is attachable at one end to a form board and at another end to a pipe in order that the position of the pipe be maintained during a concrete pouring operation.

12 Claims, 4 Drawing Sheets

PIPE SUPPORT APPARATUS

FIELD OF INVENTION

This invention relates to apparatus for supporting the pipes of a plumbing system during the construction of a cement building structure. More specifically, this invention relates to apparatus which is attachable at one end to a form board and at another end to a pipe in order that the position of the pipe be maintained during a concrete pouring operation.

BACKGROUND OF THE INVENTION

Methods of building construction are well known in the art in which the foundation of a building is constructed by first building a framework of form boards and then pouring concrete within the framework. Form boards are employed, in this regard, in order that the desired shape of concrete slab may be achieved. Typically when constructing such a concrete building structure it is desirable that plumbing be embedded in the concrete for various conventional reasons such as to achieve plumbing stability and space efficiency.

For this reason, various apparatus and methods have been conventionally employed in the construction art in order to provide mechanical support to a desired configuration of pipes until the concrete (e.g. for a foundation) is poured and has had sufficient time to set or harden (and thus secures the pipes in a permanent configuration). Current methods typically employed for this purpose involve driving lengths of rebar into the ground and then taping sections of pipe to the rebar in order to provide structural support to the pipe configuration. Because the rebar and tape are typically removed prior to the pouring of concrete so that footers may be dug, the pipe or pipes will often sag, and unless repositioned will result in a plumbing configuration which is permanently crooked (e.g. because it later becomes fixed in cement). Often this sagging can contribute to future pipe leaks or low water pressure (on the water side) or backfall and slow draining or stoppage (on the drain line side) and is thus highly undesirable.

One apparatus which is known in the art which is designed to support pipes before concrete is poured utilizing the stability of the form boards is disclosed in U.S. Pat. No. 5,125,619. This device is a simple single-piece bracket which can be attached at one end to the form board and at its other end to a pipe which is in need of support. The device described in this patent, however, is not capable of providing sufficient structural support in some circumstances and further, because it is not adjustable, is only capable of supporting a pipe structure if the pipe structure is located within a very small and specific range of distances from the form board which is to provide the bracket support.

In view of the above, it is apparent that there exists a need in the art for pipe support apparatus which overcomes, mitigates, or solves the above problems in the art. It is a purpose of this invention to fulfill this and other needs in the art which will become more apparent to the skilled artisan once given the following disclosure.

SUMMARY OF THE INVENTION

Generally speaking, this invention fulfills the above-described needs in the art by providing: a pipe support apparatus for supporting a pipe during the construction of a building comprising:

first means for attaching to a form board;

second means for attaching to a pipe; and a support member extending at an angle from the first means and provided to selectively connect to the second means when the second means is attached to a pipe thereby to support a pipe in a substantially fixed position.

In a further embodiment, there is provided: a pipe support apparatus for supporting a pipe during the construction of a building comprising:

first means for attaching to a form board;

second means for attaching to a pipe;

a first support member which is connectable to the first means and pivotally connectable to the second means; and a second support member which is connectable to the first means and pivotally connectable to the second means; whereby the first support member and the second support member, when connected to the first means and to the second means, are capable of supporting a pipe in a substantially fixed position.

This invention will now be described with respect to certain embodiments thereof as illustrated in the following drawings wherein:

DETAILED DESCRIPTION OF CERTAIN EMBODIMENTS

Figure 1:
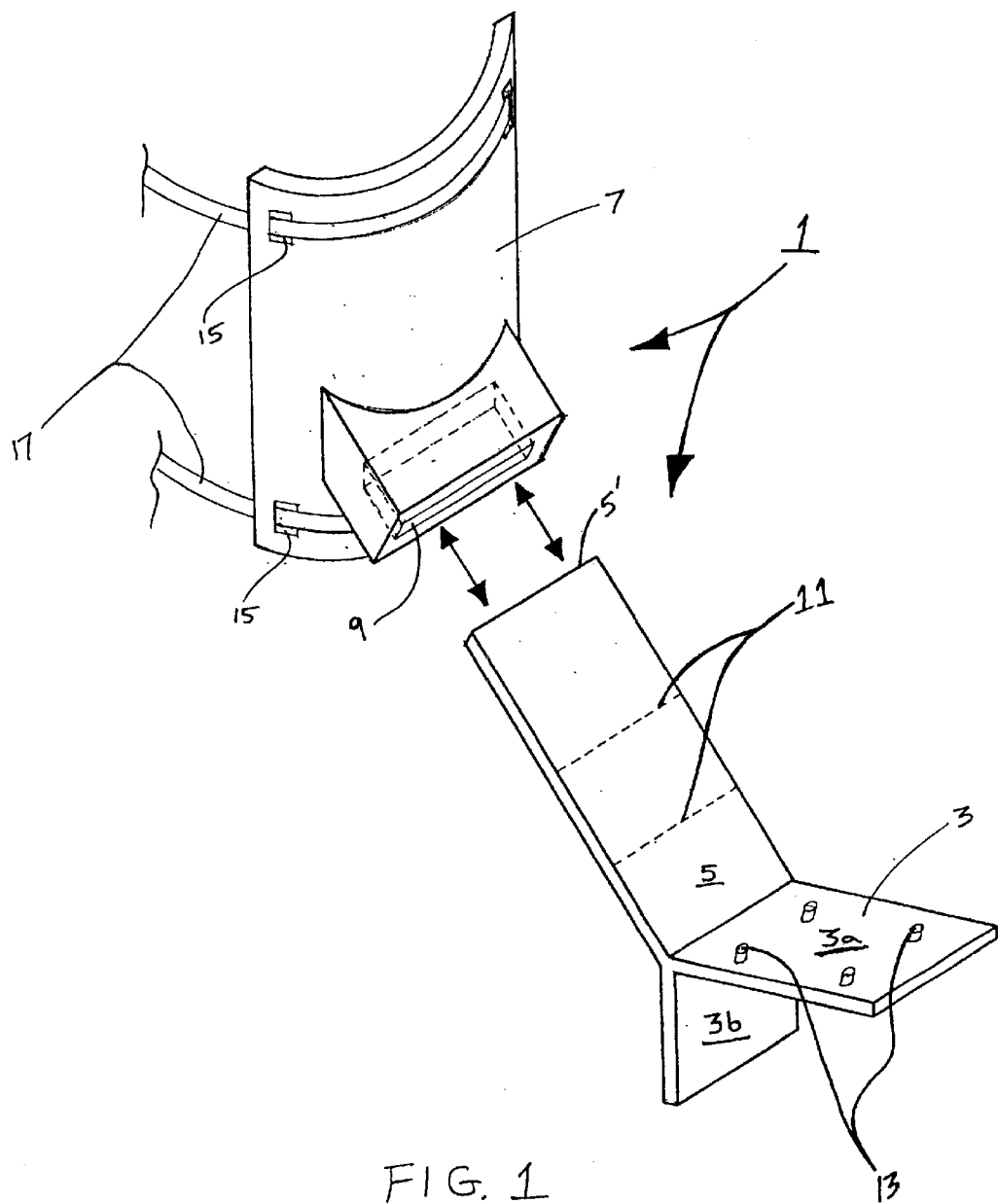
FIG. 1 is a three-dimensional view of one embodiment of the pipe support apparatus of the subject invention
Figure 2:
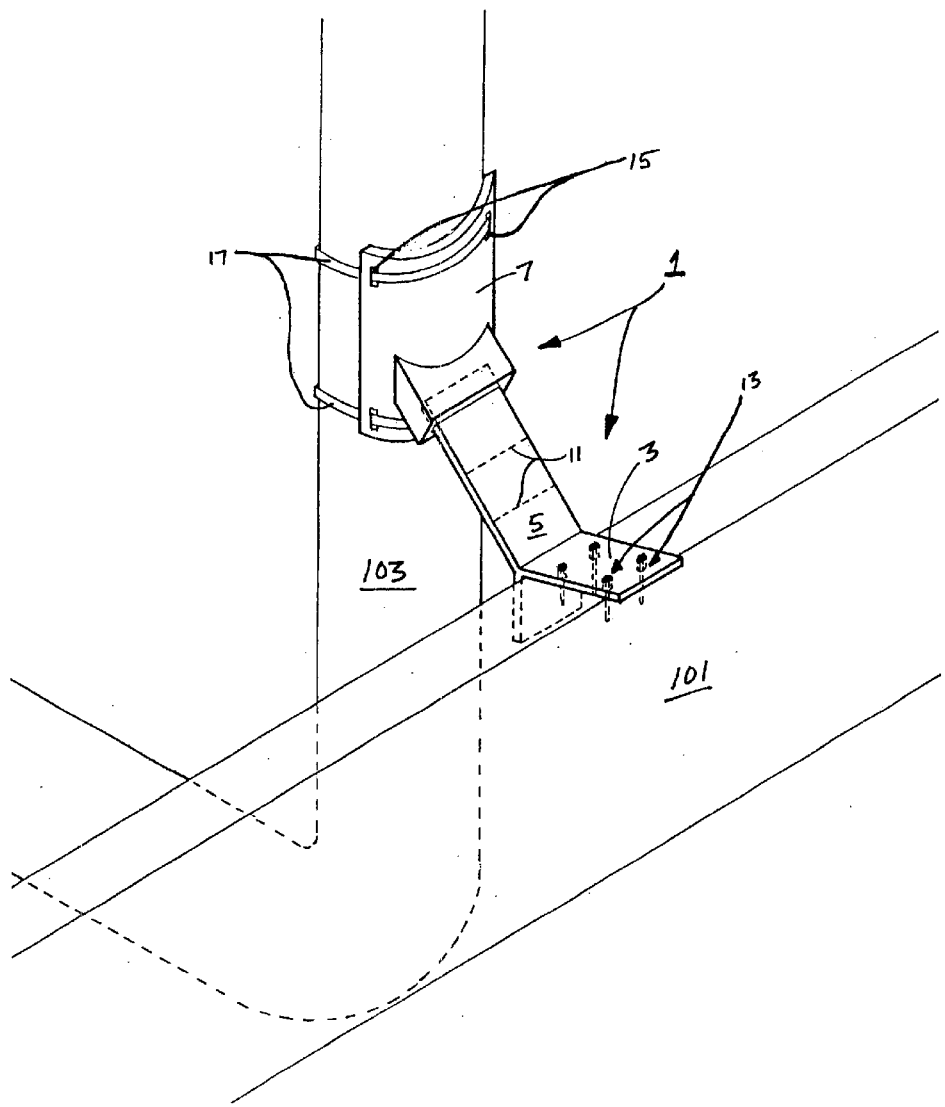
FIG. 2 is a three-dimensional view of the embodiment of FIG. 1 shown installed on a building structure

Referring initially to FIGS. 1 and 2, therein is illustrated one particularly efficacious embodiment of the improved pipe support apparatus according to the subject invention. As illustrated, pipe support apparatus 1 comprises a base member 3 which is provided to attach to a surface of a form board (shown as 101 in FIG. 2) in order to provide the required stability to the pipe support apparatus 1. In this regard, base member 3 is a simple bracket (having a horizontal member 3a and a vertical member 3b) which may be attached by any sufficient conventional means. In this exemplar embodiment, however, a plurality of guide holes 13 are provided so that nails or screws may be readily employed as an attachment mechanism.

Extending angularly from base member 3 is support brace 5 which serves to connect base member 3 to pipe bracket 7 and thus provides structural support thereto. Pipe bracket 7 is specifically shaped to attach to a surface of the pipe which is to be supported. For this purpose, pipe bracket 7 has a semi-circular surface which is shaped to complement the outside diameter of pipe 103. This ensures that good mating contact will be achieved between pipe 103 and pipe bracket 7 so as to result in greater overall stability when apparatus 1 is assembled. Further provided as part of pipe bracket 7 is orifice 9 (e.g. a rectangular slot) which is sized so that one end of support brace 5 may be inserted thereinto.

In order so that pipe apparatus 1 is user adjustable (in size) to support pipes to be installed in a variety of wall thicknesses, support brace 5 is provided (as shown herein) with a series of visual indicia (e.g. dotted lines) which designate where along the surface of support brace 5 the brace can be cut in order to accommodate a particular wall thickness. Thus, when employing this user adjustable feature of the present invention, pipes located at a variety of distances from form board 101 may be supported by a single pipe support apparatus 1 rather than requiring that a selection of various sizes be at hand.

The visual indicia 11 (shown as dotted lines in FIGS. 1 & 2) which are employed may simply be lines drawn across the lateral surface of the support brace, or in some embodiments, may be a shallow scoring of the surface of the brace. It is important, however, that if scoring is used that it not be sufficient to weaken the structural integrity of the brace such that the brace is not capable of withstanding the weight of the particular pipe which is to be supported.

In order to employ pipe apparatus 1 when constructing the foundation of a house for example, form boards 101 and pipes 103 are first erected in a manner which is known and conventional in the art and which is thus not described herein. Then, after a particular pipe 103 is chosen as in need for support, the thickness of the wall in which the pipe will be located should be determined. In this regard, a range of typical wall thicknesses is from approximately 4 inches to 8 inches thick. Once the thickness of the wall is determined (or the distance from the form board to the pipe is measured), support brace 5 may be cut at the location of the particular visual indicator 11 which corresponds to the specific wall thickness which is to be constructed (e.g. for a 6 inch thick wall). This ensures that support brace 5 will extend to an appropriate distance so that pipe 103 will be located proximate the center of the wall once the construction of the wall is completed. Next, base member 3 may be either nailed or screwed down to the form board as desired, however, other conventional methods of securing the base member to the form board may, of course, be employed. Once base member 3 is secured, the end 5' of support brace 5 is inserted into orifice 9 (thus effectively attaching base member 3 to pipe bracket 7) and pipe bracket 7 is thereafter secured to a pipe 103. This may be accomplished by placing bracket 7 up against the surface of pipe 103 and fastening bracket 7 to pipe 103 utilizing straps 17 which may be threaded through optional apertures 15 and around the pipe. Straps 17 may be plastic quick ties, wire, or any other conventional material which is known in the art. Other methods of securing bracket 7 to pipe 103, such as via adhesive, may, of course, be employed.

Assembled as such, pipe support apparatus 1 should now be adequate to maintain pipe 103 in a desired position until cement (e.g. for a foundation) is poured within the form boards and has had a chance to harden. In this regard, creating an angle between pipe bracket 7 and base member 3 through which support brace 5 extends increases the amount of weight which pipe apparatus 1 is able to support (as compared to an apparatus which employs a horizontal or non-angular support brace) and thus increases stability and prevents pipe lean during and prior to cement pouring operations. Furthermore, because it is desirable to be able to remove apparatus 1 after the cement has hardened so that it may be reused, having a support brace 5 which is angled away from the top level of the cement which is poured (typically around the same height as the top of the form board) ensures that the various parts of pipe support apparatus 1 have minimal contact with any cement thus enabling easier removal. This is in contrast to prior art devices such as disclosed in U.S. Pat. No. 5,125,619 which extend substantially horizontally from the top surface of a form board when attached and are thus in close contact with cement.

Figure 3:
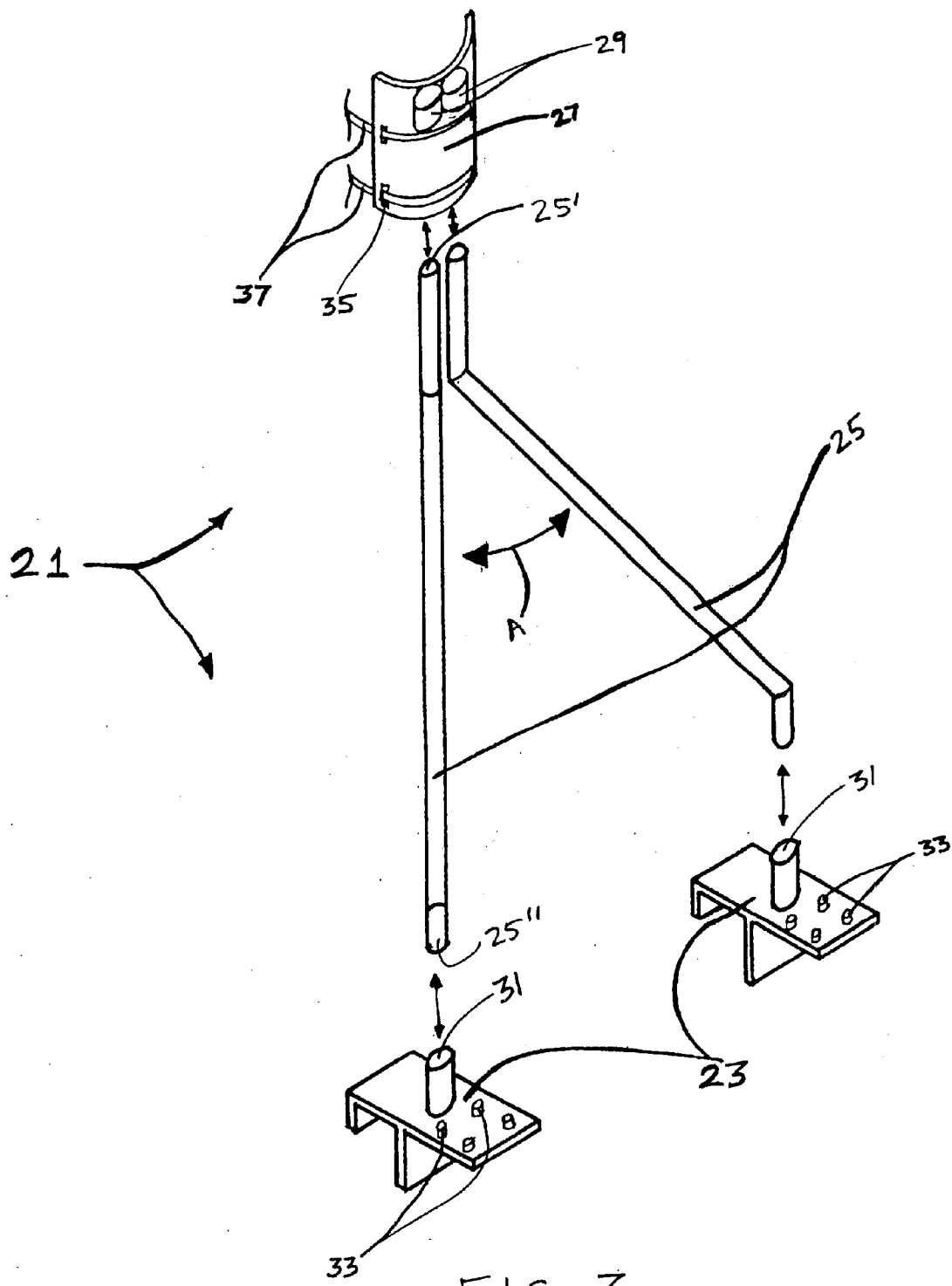
FIG. 3 is a three-dimensional view of an alternative embodiment of the subject invention.
Figure 4:
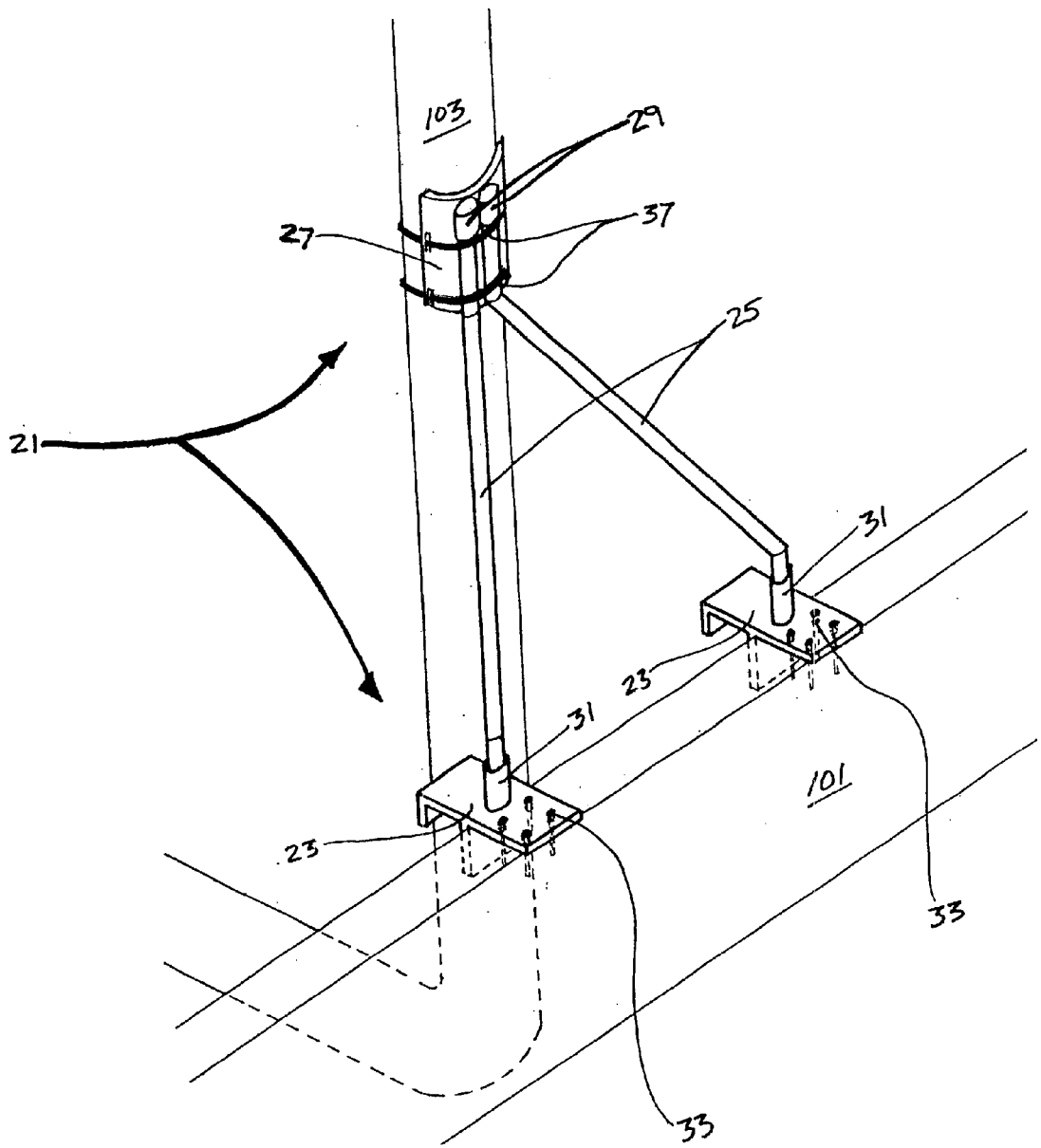
FIG. 4 is a three-dimensional view of the embodiment of FIG. 3 shown installed on a building structure.

Turning now to FIGS. 3 and 4, therein is disclosed an alternative embodiment of pipe support apparatus 1 which achieves the improved structural stability as well as the adjustability of the subject invention. Pipe support apparatus 21, in this regard, includes the same basic parts of pipe support apparatus 1 with a few modifications. Specifically, pipe support apparatus 21 includes two base members 23 and two support braces 25 rather than a single one of each as in the embodiments illustrated in FIGS. 1 & 2. In addition, rather than being integral to base members 23, support braces 25 are selectively attachable to base members 23 via the use of sleeve members 31, one sleeve extending from each of base members 23. Furthermore, rather than employing a single orifice or slot on pipe bracket 27, a second pair of sleeve members 29 are provided (on bracket 27) so that each of brace members 25 may be easily inserted and thereby attached thereto. Guide holes 33 are again provided, however, so that base members 23 may be secured by conventional means (e.g. screws or nails) to form board 101.

In order to install the embodiment of FIGS. 3 & 4 of the subject invention, pipe bracket 27 is first typically loosely mounted to the pipe which is to be supported (e.g. pipe 103 in FIG. 4) again utilizing a pair of straps 37 which may be inserted through apertures 35. Afterwards, one end 25" of the support braces 25 should be inserted into one of the sleeves 31 of base members 23. At this time, end 25' of support brace 25 can be inserted into one of sleeves 29 and then base member 23 placed in a suitable position on form board 101. This process is then repeated for the second support brace. It should be noted, in this respect, that because support braces 25 are each pivotable at their attachment points to both pipe bracket 27 and to base members 23, various spacings of pipe 103 from the form board (and thus various wall thicknesses) can be accommodated without the need to trim any portion of the support brace or to choose a particular length of support brace. This is because, once assembled, support brace members 25 can be pivotally moved so that base members 23 are either closer to or farther away from pipe 103 (by simply moving base members 23 closer to or away from each other so that they are aligned with the top surface of form board 101) in order to accommodate pipes located at varying distances from form board 101. This adjustability, which is achievable by the back and forth pivotal movement of support braces 25, is indicated in FIG. 3 by arrow "A" which illustrates the directions in which support braces 25 may be manipulated. Once base members 23 are in place at the desired location (aligned with the top surface of form board 101), they are simply secured to the form board such as by the use of nails for example. Once this is done, pipe 103 is sufficiently supported (i.e. stabilized) and cement can be poured to form the foundation without concern of significant shifting or drooping of the pipes which are being supported. After the cement has dried, pipe support apparatus 21 may be removed by simply cutting straps 37 and removing support braces 25 and bases 23 (afterwhich apparatus 21 may, of course, be reused).

Once given the above disclosure, many other features, modifications, and improvements will become apparent to the skilled artisan. Such other features, modifications, and improvements are therefore considered to be a part of this invention, the scope of which is to be determined by the following claims:

I claim:

1. A pipe support apparatus for supporting a pipe during the construction of a building comprising:

a first attachment member for attaching said pipe support apparatus to a form board;

a second attachment member for attaching to a pipe; and a support member extending at an obtuse angle from said first attachment member to said second attachment member thereby to support said pipe prior to and during a concrete pouring operation; wherein said support member includes visual indicia located on at least one surface, said visual indicia indicating an area to cut thereby to size said support member such that said support member, in combination with said second attachment member, is capable of supporting a pipe at a location corresponding to a predetermined wall thickness: and wherein said second attachment member comprises a securing bracket having a semi-spherical surface for attachment of a pipe thereto and includes an orifice for insertion of one end of said support member.

2. The pipe support apparatus according to claim 1 wherein said securing bracket further includes at least a first pair of apertures, said first pair of apertures being provided for insertion of a securing band therethrough.

3. The pipe support apparatus according to claim 2 wherein said securing bracket is attachable to a pipe utilizing a securing band inserted through said first pair of apertures and fastened around the circumference of the pipe.

4. The pipe support apparatus according to claim 1 wherein said first attachment member comprises a base bracket including:

a first form board contacting surface; and a second form board contacting surface extending at an angle approximately perpendicular to said first form board contacting surface.

5. A pipe support apparatus for supporting a pipe during the construction of a building comprising:

first means for attaching to a form board;

second means for attaching to a pipe;

a first support member which is connectable to said first means and pivotally connectable to said second means; and a second support member which is connectable to said first means and pivotally connectable to said second means; whereby said first support member and said second support member, when connected to said first means and to said second means, are capable of supporting a pipe in a substantially fixed position.

6. The pipe support apparatus according to claim 5 wherein when said first support member is connected to said first means, said first support member extends at a first angle therefrom; and wherein when said second support member is connected to said first means, said second support member extends at a second angle therefrom.

7. The pipe support apparatus according to claim 6 wherein said first and said second support members are pivotally moveable when connected to said second means such that pivotally moving said first and said second support members permits said pipe support apparatus to be adjustable to be usable to support pipes located at a variety of distances from a form board.

8. The pipe support apparatus according to claim 7 wherein said second means comprises a securing bracket having a semi-spherical surface for attachment of a pipe thereto and includes a pair of orifices for insertion of one end each of said first and said second support members.

9. The pipe support apparatus according to claim 8 wherein said securing bracket further includes at least a first pair of apertures, said first pair of apertures being provided for insertion of a securing band therethrough.

10. The pipe support apparatus according to claim 7 wherein said first means comprises a base bracket including:

a first form board contacting surface; and a second form board contacting surface extending at an angle approximately perpendicular to said first form board contacting surface.

11. The pipe support apparatus according to claim 7 wherein said first and said second angles are selected from between 20 and 70 degrees.

12. The pipe support apparatus according to claim 7 wherein said first and said second angles are selected from between 30 and 60 degrees.

\* \* \* \* \*